W. C. WESTAWAY.
CARBURETER.
APPLICATION FILED SEPT. 28, 1905.
999,686.
Patented Aug. 1, 1911.
2 SHEETS—SHEET 2.
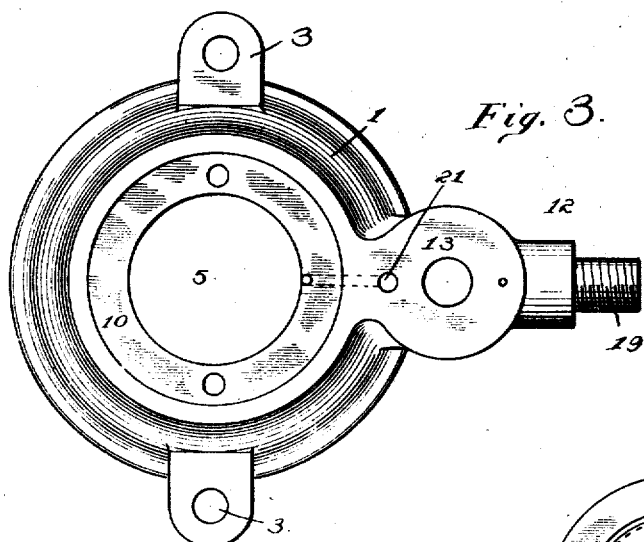
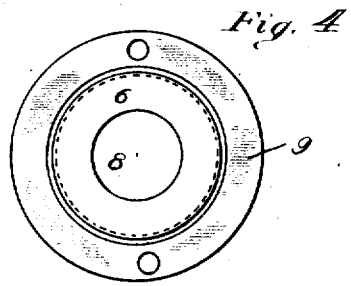
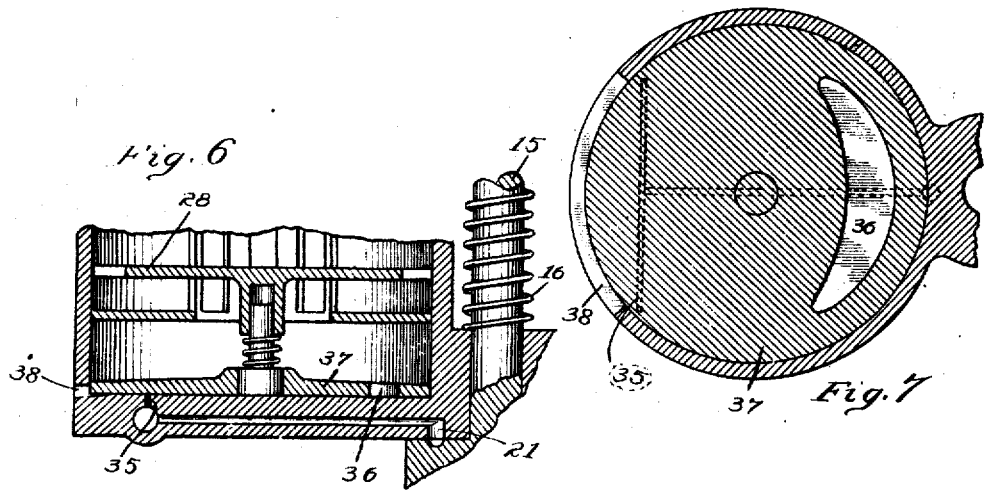
Witnesses:
John Braunwalder
Charles J. Cobb
Inventor:
Walter C. Westaway
by Hill & Hill,
Att'ys.

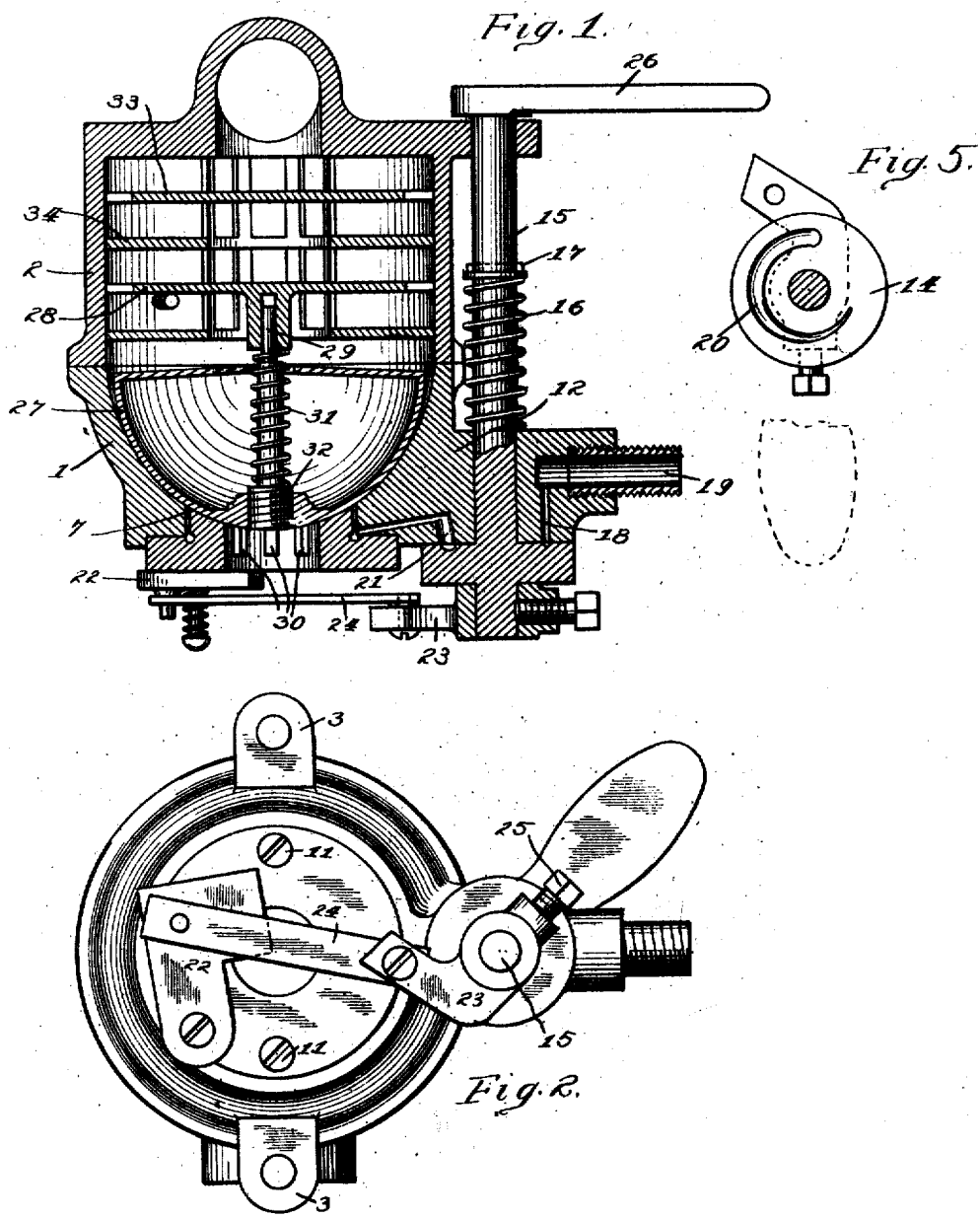

UNITED STATES PATENT OFFICE.

WALTER C. WESTAWAY, OF ROCKFORD, ILLINOIS, ASSIGNOR, BY DIRECT AND MESNE ASSIGNMENTS, TO CHICAGO PNEUMATIC TOOL COMPANY, OF CHICAGO, ILLINOIS, A CORPORATION OF NEW JERSEY.

CARBURETER.

999,686.

Specification of Letters Patent. Patented Aug. 1, 1911.

Application filed September 28, 1905. Serial No. 280,545.

*To all whom it may concern:*

Be it known that I, WALTER C. WESTAWAY, of Rockford, county of Winnebago, and State of Illinois, have invented certain new and useful Improvements in Carbureters and the Like, of which the following is a description.

My invention belongs to the general class of devices designed to commingle air or gas and a suitable liquid, such, for example, as a hydro-carbon, for any desired purpose, and has for its object the production of a simple and efficient means for the purpose which will thoroughly and perfectly accomplish the object sought.

To this end, my invention consists in the novel construction, arrangement, and combination of parts herein shown and described, and more particularly pointed out in the claims.

In the drawings, wherein like reference characters indicate like or corresponding parts:—Figure 1 is a central vertical section through my device. Fig. 2 is a bottom plan of the same. Fig. 3 is a bottom plan of the same with the air and liquid valves and the bottom closure removed. Fig. 4 is a plan view of the bottom closure of the shell removed from its seat. Fig. 5 is a bottom plan of the liquid valve. Fig. 6 is a central vertical section of the bottom part of a modified form of my device, and Fig. 7 is a plan view of the bottom of the shell shown in Fig. 6 showing the interior construction.

In the preferred form shown in the drawings, 1 represents the base, and 2 a suitable top for a shell or casing forming a carbureting chamber. The two may be suitably secured together in any preferred manner. As shown, the parts are provided with registering lugs 3, which may be secured together by suitable bolts or equivalent means. The base is formed with a preferably circular opening 5 for the reception of a similarly formed part 6, which is slightly smaller than the opening, and which, when in place, is spaced therefrom on all sides forming an annular inlet 7 for the entrance of the liquid. The part 6 is also annular, inclosing an opening 8 which serves as an inlet for the air, and is provided with an outwardly extending flange 9 constructed to be snugly seated in a corresponding recess or depression 10 formed in the base. Any suitable means may be employed to secure the part 6 in place. As shown, screws 11, 11, serve this purpose.

The base is preferably formed with an off-set 12, providing a valve-seat 13, and a support for the rotatable liquid valve 14, whose stem 15 passes therethrough. A spring 16 resting upon the face of the off-set or extension 12, and beneath a pin 17, or equivalent part, on the stem, serves to resiliently hold the valve to its seat. A duct 18 serves to conduct the liquid from the supply pipe 19 to the valve 14, which is provided with a groove 20 formed in its face which, closing against the valve-seat forms a duct for the liquid. The groove 20 is peculiarly formed, being slightly eccentric to the valve stem and gradually and regularly increased in size from one to the other, and, for convenience, may be termed an increasing spiral groove (Fig. 5).

A duct 21 formed in the valve-seat and extending from a point in the path of the groove 20 to the annular inlet 7, serves to conduct the liquid to the shell. It will thus be seen that when the valve is closed the flat face of the same covers and effectually closes the end of the duct 18. As the valve is rotated, the duct 18 is gradually opened, permitting the fluid to enter the groove 20 and thence through the duct 21 to the annular inlet 7. By this means, fluid is delivered to the shell in a ring inclosing the air-inlet 8, for a purpose herein described. In the preferred form, a valve of any suitable construction is employed to control the admission of air through the inlet 8. As shown, a shutter-valve 22 serves this purpose.

It is desirable that the proportions of liquid and air may be uniformly maintained in operating the device, hence I prefer to so connect the valves 14 and 22 that they may be operated synchronously. To this end, I secure an arm 23 upon the end of the valve-stem 15 to form a bell crank lever and connect the valve 22 thereto by a link 24, or equivalent means. It will thus be obvious that the operation of the valve 14 involves a corresponding operating of the air-valve. Suitable means are provided for the adjustment of the two valves relative to one another. This may be readily accomplished in any preferred manner, for example, by adjusting the position of the arm 23 on the stem 15, the set-screw 25 serving to firmly maintain the parts in their adjusted position. A handle 26 secured to the stem 15 serves as means for operating the valves.

Within the shell or mixing chamber, means are provided to secure a thorough commingling of the inflowing liquid and air. In the preferred construction, the bottom of the shell is concave or spheriform, and the correspondingly formed spreader or deflector 27 loosely fitting therein, coöperates therewith in the operation of the device. The deflector 27 is vertically movable, normally resting in such a position as to tend to close the inlets 7 and 8, and to prevent the inflow of both liquid and air. The operation of the engine or a coöperating pump to which the device is attached, however, will tend to produce a partial vacuum in the mixing chamber, momentarily lifting the deflector and providing a narrow channel between the exterior surface of the same and the interior of the shell. The same action permits the inflowing of the liquid through the annular inlet 7, and the air through the inlet 8, the current of air being directed over the ring of fluid, taking up a quantity thereof, and filling the chamber with the mixture. As the deflector 27 assumes its normal position, it contacts with the ring of fluid, tending to spread the same out evenly into a thin film between, and coating the surfaces of, the proximate parts forming the channel between the deflector and the chamber and again closing the inlets. This action obviously thinly spreads the liquid over a comparatively large area, comprising the exterior surface of the deflector and the interior surface of the shell over which area the regulated current of inflowing air is periodically and evenly directed by the pulsating operation of the device.

Any preferred means may be employed for suitably guiding the operation of the deflector. As shown, a plate 28 suitably supported within the shell, receives the end of the guide post 29, while the lower part of the deflector is provided with extensions 30 positioned within the opening 8. A coil spring 31 positioned between a shoulder 32 on the guide post 29, and the plate 28, or equivalent means serves to resiliently maintain the deflector in its normal position. The deflector is preferably substantially closed at the top to prevent the accumulation of fluid therein. If desired, a system of baffle-plates 33, 34, may be employed to secure a more thorough mixture of the gas and fluid in the shell, and the plate 28 is preferably also formed to serve as one of the series of baffle plates for that purpose.

As shown in Figs. 6 and 7, the bottom of the shell is flat, while the liquid inlet 35 is lengthened to distribute the inflowing liquid over a comparatively large area. An aperture 36, of considerable size, is formed through the spreader 37, while the air inlet 38 is formed in the side of the shell, and is adapted to be closed by the edge of the spreader. The liquid inlet is interposed between the air inlet and the aperture 36, so that the inflowing air will be directed over the inflowing liquid. The operation of the spreader is substantially the same, at each operation the liquid is mechanically spread over the proximate surfaces of the spreader and bottom of the shell, over which the current of flowing air is directed, escaping into the shell through the aperture 36. Obviously by this construction the area over which the liquid is mechanically spread is somewhat reduced and the form previously described is preferred.

It is obvious that my improved device may be employed otherwise than as a carbureter. It is effective in cases where it is desired to mix a liquid and a gas, such, for example, as for sanitary purposes, where it is desired to mix a disinfecting fluid with air. Consequently, by the use of the term "carbureter" in the claims, I do not wish to be understood as limiting myself to the use of the device for carbureting purposes only. It is also apparent that my improvement forms a triple valve device, in which the valve 14 or equivalent means controls the flow of liquid and the valve 22, the flow of air, while the deflector 27 forms a third valve which automatically controls the entrance of both liquid and air in the mixing chamber.

Having thus described my invention, what I claim as new, and desire to secure by Letters Patent is:

1. A carbureter comprising a shell or casing provided with a liquid inlet, an air inlet, and an outlet, in combination with a valve pivotally mounted upon the exterior of said casing for swinging movement in proximity to said air inlet adapted to close the same, a rotatable valve mounted upon the exterior of said casing for controlling said liquid inlet, a crank upon said liquid valve and a link connecting said crank to said air valve whereby upon operating said liquid valve the air valve will be correspondingly operated.

2. A carbureter comprising a shell or casing provided with a liquid inlet, an air inlet, and an outlet, in combination with a valve pivotally mounted upon the exterior of said casing in proximity to said air inlet adapted to close the same, a rotatable valve mounted upon the exterior of said casing for controlling said liquid inlet, a crank upon each of said air and liquid valves, and a link connecting said cranks whereby upon operating said liquid valve the air valve will be correspondingly operated.

3. A carbureter comprising a shell or casing provided with a liquid inlet, an air inlet, and an outlet, in combination with a valve pivotally mounted upon the exterior of said casing in proximity to said air inlet adapted to close the same, a rotatable valve mounted upon the exterior of said casing for controlling said liquid inlet, a crank upon each of said air and liquid valves and a link connecting said crank whereby upon operating said liquid valve said air valves will be correspondingly operated, and a spreader positioned within the shell arranged to coöperate with the walls thereof to spread the inflowing liquid into a film.

4. A carbureter comprising a shell or casing provided with a liquid inlet, an air inlet and an outlet, in combination with a valve pivotally mounted upon the exterior of said casing in proximity to said air inlet adapted to close the same, a rotatable valve mounted upon the exterior of said casing for controlling said liquid inlet, a crank upon each of said air and liquid valves and a link connecting said cranks whereby upon operating said liquid valve the air valve will be correspondingly operated, and a movable spreader positioned within the shell resiliently held in position therein arranged to coöperate with the walls of said shell to spread the inflowing liquid into a film.

5. In a valve construction, the combination of a valve seat, a rotary valve having a surface in engagement with said seat, a stem for the valve projecting through an opening in said seat, a spring on the valve stem for holding the valve in adjusted positions, the said seat being provided with an inlet duct and an exit duct on opposite sides of said opening, the valve having a tapering groove in its surface closing against its seat normally in communication and registering with one of said ducts, adapted when moved to connect said ducts and by its position control the size of the passage therebetween, an auxiliary opening in said valve seat and a valve for said opening actuated by the movement of the said valve stem.

In testimony whereof, I have hereunto signed my name in the presence of two subscribing witnesses.

WALTER C. WESTAWAY.

Witnesses:
BLANCHE PARDRIDGE,
R. F. LOCKE.